US011656787B2

United States Patent
Okuyama et al.

(10) Patent No.: US 11,656,787 B2
(45) Date of Patent: May 23, 2023

(54) CALCULATION SYSTEM, INFORMATION PROCESSING DEVICE, AND OPTIMUM SOLUTION SEARCH PROCESS METHOD

(71) Applicant: Hitachi, Ltd., Tokyo (JP)

(72) Inventors: Takuya Okuyama, Tokyo (JP); Masanao Yamaoka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 260 days.

(21) Appl. No.: 17/274,449

(22) PCT Filed: Apr. 29, 2020

(86) PCT No.: PCT/JP2020/018203
§ 371 (c)(1),
(2) Date: Mar. 9, 2021

(87) PCT Pub. No.: WO2021/220445
PCT Pub. Date: Nov. 4, 2021

(65) Prior Publication Data
US 2022/0027082 A1   Jan. 27, 2022

(51) Int. Cl.
*G06F 17/11* (2006.01)
*G06F 3/06* (2006.01)
(Continued)

(52) U.S. Cl.
CPC .......... *G06F 3/0655* (2013.01); *G06F 3/0604* (2013.01); *G06F 3/0679* (2013.01);
(Continued)

(58) Field of Classification Search
None
See application file for complete search history.

(56) References Cited

U.S. PATENT DOCUMENTS 10,423,131 B2 * 9/2019 Santin .................. G05B 13/048
2015/0242360 A1 * 8/2015 Lustig ..................... G06F 17/11
708/208

(Continued)

FOREIGN PATENT DOCUMENTS

JP       2016-51314 A     4/2016
WO    2019/216277 A1    11/2019

OTHER PUBLICATIONS

Takuya Okuyama, et al., "Binary optimization by momentum annealing", Physical Review E 100, 012111, (2019).
(Continued)

*Primary Examiner* — Elias Mamo
(74) *Attorney, Agent, or Firm* — Mattingly & Malur, PC (57) ABSTRACT

A calculation system includes a variable memory storing a value indicating a state of a variable of a mixed integer quadratic programming problem; a state transition calculation block that calculates the next state of the value indicating the state of the variable; a nonlinear coefficient memory that stores a nonlinear coefficient of the state transition calculation block; a linear coefficient memory that stores a linear coefficient of the state transition calculation block; a weight input line that receives a weight signal of the state transition calculation block; and a temperature input line that receives a temperature signal of the state transition calculation block. The state transition calculation block includes a difference calculation block that calculates a difference calculation by using the weight signal, the nonlinear coefficient, and the linear coefficient. A next state determination block calculates the next state of the variable using the value read from the variable memory.

15 Claims, 9 Drawing Sheets

(51) Int. Cl.
*G06F 17/16* (2006.01)
*G06F 17/00* (2019.01)

(52) U.S. Cl.
CPC .............. *G06F 17/00* (2013.01); *G06F 17/11* (2013.01); *G06F 17/16* (2013.01)

(56) References Cited

U.S. PATENT DOCUMENTS

| | | | |
|---|---|---|---|
| 2016/0065210 A1 | 3/2016 | Yoshimura et al. | |
| 2018/0005114 A1* | 1/2018 | Tomita | G06F 1/28 |
| 2019/0220496 A1* | 7/2019 | Ito | G06F 17/18 |
| 2020/0401651 A1* | 12/2020 | Tamura | G06F 17/11 |

OTHER PUBLICATIONS

Bolev, "The normal law under linear restrictions: simulation and estimation via minimax tiling", Journal of the Royal Statistical Society Statistical Methodology Series B, 2016.

Radford M. Neal, "Suppressing random walks in markov chain monte carlo using ordered overrelaxation", M. I. Jordan (ed.), Learning in Graphical Models, 1998, pp. 205-228.

Takuya Okuyama, et al.,"Binary optimization by momentum annealing", Physical Review E 100, 012111 [online], 2019.

Masaki Sasai, "Emerging Science of Systems with Ultra Many Degrees of Freedom",Computational Science and Engineering, vol. 10, Nov. 30, 2010, p. 19-73.

\* cited by examiner

CALCULATION SYSTEM, INFORMATION PROCESSING DEVICE, AND OPTIMUM SOLUTION SEARCH PROCESS METHOD

TECHNICAL FIELD

The present invention relates to an information processing device, a calculation device, an information processing method, and the like, and relates to a technique for executing an optimum solution search process.

BACKGROUND ART

PTL 1 discloses "a semiconductor device including a plurality of unit units that include a first memory cell that stores a value representing one spin of the Ising model in three or more states, a second memory cell that stores an interaction coefficient indicating an interaction from another spin that interacts with one spin, and a logic circuit that determines the next state of one spin based on a value that represents the state of another spin and a function that has the interaction coefficient of as a constant or variable."

PTL 2 discloses a method for realizing an optimum solution search by stochastically updating all spins at the same time while satisfying the theoretical background required by the Markov Chain Monte Carlo method for an Ising model having an arbitrary coupling.

CITATION LIST

Patent Literature

PTL 1: JP-A-2016-51314
PTL 2: WO-A-2019/216277

Non-Patent Literature

NPL 1: Okuyama, T., Sonobe, T., Kawarabayashi, K. I., & Yamaoka, M. (2019). Binary optimization by momentum annealing. Physical Review E, 100(1), 012111

NPL 2: Botev, Z. I. (2017). The normal law under linear restrictions: simulation and estimation via minimax tilting. Journal of the Royal Statistical Society: Series B (Statistical Methodology), 79(1), 125-148

NPL 3: Neal, R. M. (1998). Suppressing random walks in Markov chain Monte Carlo using ordered overrelaxation. In Learning in graphical models (pp. 205-228). Springer, Dordrecht

SUMMARY OF INVENTION

Technical Problem

Many physical and social phenomena can be expressed by interaction models. An interaction model is defined by a plurality of nodes constituting the model, interactions between the nodes, and further, coefficients that act on each node, if necessary. In the fields of physics and social science, various models including the Ising model have been proposed, but all of them can be interpreted as one form of interaction models.

It is important to obtain a node state that minimizes or maximizes an index associated with this interaction model in solving social issues. Examples thereof include the problem of detecting creeks in social networks and the problem of portfolio optimization in the financial field. In the field of operations research, these are roughly divided into unconstrained binary quadratic programming problems and mixed binary quadratic programming problems.

The present invention has been made in view of the above background and an object thereof is to provide a technique capable of executing the optimum solution search for a mixed binary quadratic programming problem, including a ground state search for the Ising model at a high speed.

Solution to Problem

A preferred aspect of the present invention is a calculation system including a variable memory that stores a value indicating a state of a variable of a mixed integer quadratic programming problem; a state transition calculation block that calculates the next state of the value indicating the state of the variable; a nonlinear coefficient memory that stores a nonlinear coefficient of the state transition calculation block; a linear coefficient memory that stores a linear coefficient of the state transition calculation block; a weight input line that receives a weight signal of the state transition calculation block; and a temperature input line that receives a temperature signal of the state transition calculation block. The state transition calculation block includes a difference calculation block that calculates difference calculation by using the weight signal, the nonlinear coefficient, and the linear coefficient, a sampling block that performs random sampling from a probability distribution with an interval constraint by using the weight signal, the temperature signal, and an output value of the difference calculation block, and a next state determination block that calculates the next state of the variable by using the value read from the variable memory.

In another preferred aspect, the variable memory stores continuous values as values $x_1, \ldots, x_N$ and $y_1, \ldots, y_N$ indicating the state of the variable.

Another preferred aspect of the present invention is an information processing device including the calculation system; and a computer that controls the calculation system. The information processing device includes a storage unit and a variable value reading unit, in which the storage unit stores the domain of the variable of the mixed integer quadratic programming problem, and the variable value reading unit reads a value from the variable memory and transforms at least a part of the continuous value to a binary value based on the domain of the variable.

Advantageous Effects of Invention

According to the present invention, it is possible to solve an optimization problem referred to as a mixed binary quadratic programming problem at a high speed. Objects, configurations, and effects other than those described above will be clarified by the following description of embodiments for carrying out the invention.

DESCRIPTION OF EMBODIMENTS

Hereinafter, embodiments will be described in detail based on the drawings. In the following description, the same or similar configurations are denoted by common reference numerals and the duplicated descriptions maybe omitted. When there are a plurality of elements having the same or similar functions, the description may be made with the same reference numerals having different subscripts. If it is not necessary to distinguish between a plurality of elements, the subscripts may be omitted for the explanation.

Notations such as "first", "second", and "third" in the present specification are provided to identify the components and do not necessarily limit the number, order, or contents thereof. In addition, numbers for identifying components are used for each context, and numbers used in one context do not always indicate the same configuration in other contexts. Further, it does not prevent the component identified by a certain number from having the function of the component identified by another number.

One embodiment described below is a calculation system including a variable memory that stores a value indicating a state of a variable in a mixed integer quadratic programming problem, a nonlinear coefficient memory that stores nonlinear coefficient of a state transition calculation block corresponding to the variable memory, a linear coefficient memory that stores a linear coefficient of a state transition calculation block corresponding to the variable memory, a weight input line that receives a weight signal of the state transition calculation block, a temperature input line that receives a temperature signal of the state transition calculation block, a difference calculation block that calculates difference calculation by using the weight signal of the state transition calculation block, the nonlinear coefficient of the state transition calculation block, and the linear coefficient of the state transition calculation block, a sampling block that performs random sampling from a probability distribution with an interval constraint by using the weight signal of the state transition calculation block, the temperature signal of the state transition calculation block, and the output value of the difference calculation block, and a next state calculation block that calculates the next state of the variable by using the output value of the sampling block and the value read from the variable memory.

Generally, an integer programming problem refers to an optimization problem that includes integer variables. A case where variables that take integer values and variables that take real numbers are mixed is referred to as a mixed integer programming problem. A mixed integer programming problem that is a quadratic programming problem is referred to as a mixed integer quadratic programming problem. In the present specification, particularly, a mixed integer quadratic programming problem in which variables that take binary values and variables that take real values are mixed is referred to as a mixed binary quadratic programming problem. First, the significance of the mixed binary quadratic programming problem is explained.

Depending on the optimization problem desired to solve, binary variables and continuous variables may be mixed. For example, with respect to the problems in the financial field, the purchase ratio of financial products may be 0%, or 10% to 100%. If the product is not purchased, the purchase ratio will be, of course, 0%, and if the product is purchased, the purchase ratio will be 10% or more of the minimum unit. At this time, by using the binary variable $x \in \{-1,1\}$ and the continuous variable $y \in [-1,1]$, which indicate whether to purchase or not, the purchase ratio r can be expressed as:

$$r=\{(1+x)/2\} \times \{0.1+0.9 \times (1+y))/2\}.$$

The continuous variable y can be discretely expressed with a plurality of binary variables, but by making it possible to handle continuous variables, the number of variables is only one. Therefore, by allowing the computer system to handle continuous variables, the number of variables in the optimization problem can be reduced and the scale of the problem that can be handled by the computer resources can be increased. Moreover, when solving a certain problem, a shortening of the calculation time can be expected because the number of variables is reduced.

Meanwhile, the problem can be handled only with continuous variables, but with continuous variables, values such as 0.3 are allowed even for variables for which only −1 or +1 is desired to be accepted as a value. In this case, if a constraint of "the variable x is −1 or +1" is added, for example, to the objective function as a penalty function $(x^2-1)^2$, the variable x can be handled as a continuous variable but a quadratic expression cannot be obtained. In addition, there is a problem that the objective function becomes complicated and thus the optimum solution is hardly found. Therefore, in the case of forming a quadratic programming problem, if the domain of a predetermined variable is set to a binary value or a discrete value from the beginning, there is a merit of a configuration in which the problem can be handled with a computer. Hereinafter, when referred to only as an optimization problem in the present specification, it means a mixed binary quadratic programming problem.

There are N variables $s_1$ to $s_N$ of the optimization problem (here, meaning the mixed binary quadratic programming problem). A domain $D_i$ of each variable is either a binary value $\{-1, +1\}$ or a continuous value $[-1, +1]$. The value of the domain is determined for each problem. Also, an objective function H of the optimization problem is expressed as Expression 1. That is, the objective function H is represented by a quadratic expression of the variable s.

[Expression 1]

$$H(s) = -\frac{1}{2}s^T J s - h^T s \qquad (1)$$

In Expression 1, s=N-dimensional vector of $[s_1, \ldots, s_N]$, J is an N×N symmetric matrix, and h is an N-dimensional vector. As described above, the domain differs for each variable, and thus the mixed binary quadratic programming problem can be expressed as Expression 2.

[Expression 2]

$$\min_{s_i \in D_i} H(s) \qquad (2)$$

Here, sets of subscripts $\Lambda_b$ and $\Lambda_c$ are defined as in Expression 3.

[Expression 3]

$$\begin{cases} \Lambda_b = \{i \mid D_i = \{-1, 1\}\} \\ \Lambda_c = \{i \mid D_i = [-1, 1]\} \end{cases} \quad (3)$$

The set $S_{mixed} = \{s \mid s_i \in D_i\}$ is defined. If these notations are used, Expression 2 can also be expressed as Expression 4.

[Expression 4]

$$\min_{s \in S_{mixed}} H(s) \quad (4)$$

Hereinafter, for all $i \in \Lambda_b$, the element of the i-th row and i-th column of a matrix J is set to 0. This is because this transformation does not change the optimal solution of Expression 2.

If $D_i = \{-1, +1\}$ for all i, this optimization problem is a combinatorial optimization problem referred to as the ground state search problem of the Ising model. In the present embodiment, in the optimization problem including the search for the ground state of the Ising model, an optimum solution or an approximate solution is searched by an algorithm using the Markov Chain Monte Carlo method (hereinafter, referred to as MCMC).

Figure 1:
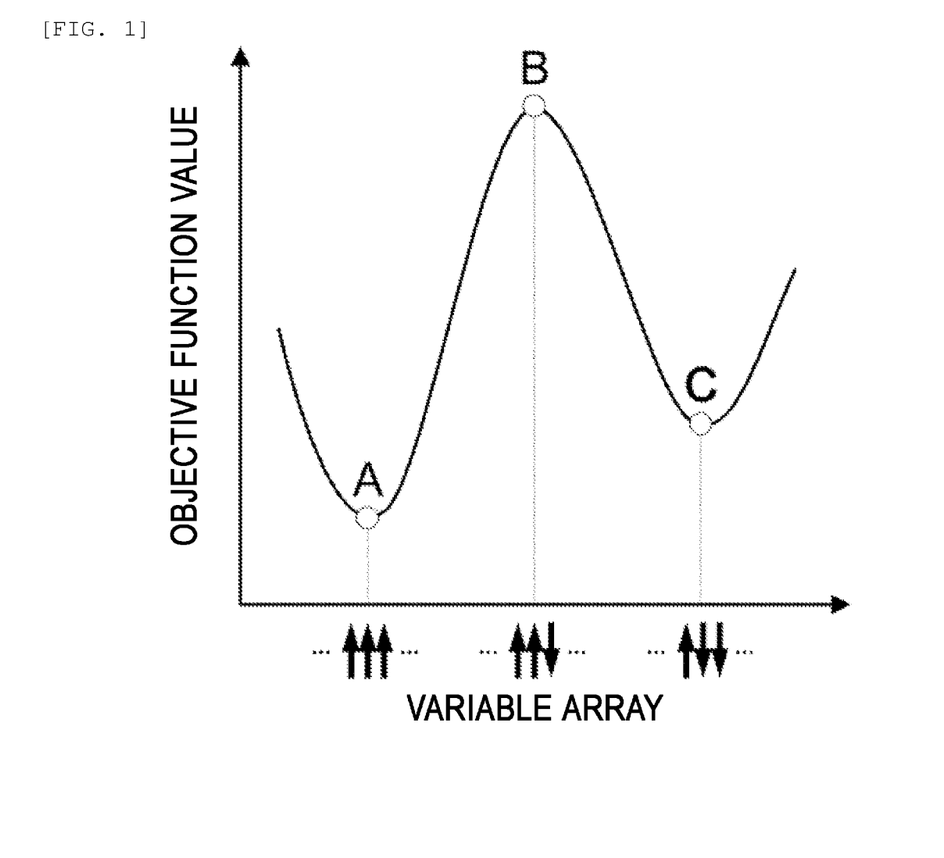
FIG. 1 is a conceptual diagram illustrating a relationship between a variable array and an objective function value of an optimization problem.

FIG. 1 is a conceptual diagram illustrating a landscape of objective function values for a variable array. The horizontal axis of the graph is the variable array s, and the vertical axis is the objective function H(s). MCMC repeats a stochastic transition from a current state s to a certain state s' near the state s. The probability of transition from the state s to the state s' is referred to as transition probability P (s, s'). Examples of the transition probability P include the Metropolis method and the heat-bath algorithm.

The transition probability has a parameter referred to as temperature, which indicates the ease of transition between states. When MCMC is executed while gradually decreasing the temperature from a large value, it asymptotically converges to the state in which the objective function value is the lowest. A method of obtaining the optimum solution or the approximate solution of the minimization problem by utilizing the above is Simulated Annealing (hereinafter, referred to as SA) or Momentum Annealing (hereinafter, referred to as MA) proposed in NPL 1.

In solving the minimization problem presented in Expression 4, solving a minimization problem of Expression 5 is considered instead. Here, the set $S_{relaxed} = \{s \mid s_i \in [-1, +1]\}$.

[Expression 5]

$$\min_{s \in S_{relaxed}} H(s) \quad (5)$$

The optimum solution of Expression 5 is indicated as $s^* = [s_1^*, \ldots, s_N^*]$. Although the proof is omitted, $s^+ = [s_1^+, \ldots, s_N^+]$ obtained by following Expression 6 is one of the optimum solutions of Expression 4. The goal of the examples shown in the present application is to search for the optimum solution of Expression 2. However, even if the transformation of Expression 6 is obtained after solving the optimum solution $s^*$ of Expression 5, the desired solution $s^+$ can be obtained. Here, the function sgn is a function that returns +1 if an argument is 0 or more and returns −1 otherwise.

[Expression 6]

$$s_i^+ = \begin{cases} sgn(s_i^*) & (i \in \Lambda_b) \\ s_i^* & (i \in \Lambda_c) \end{cases} \quad (6)$$

Here, an N-dimensional vector $v = [v_1, \ldots, v_N]$ is introduced to define a function H' presented in Expression 7.

[Expression 7]

$$H'(s, v) = H(s) + V(v) \quad (7)$$

Here, the function V(v) is as defined in Expression 8.

[Expression 8]

$$V(v) = \frac{1}{2} v^T (J + 2W) v \quad (8)$$

The matrix $W = diag(w_1, \ldots, w_N)$ is any diagonal matrix, and $v_i$ is a real number that moves $[-1, +1]$. Instead of the minimization problem of Expression 5, Expression 9 that is a minimization problem of H' (s, v) is introduced.

[Expression 9]

$$\min_{s \in [-1,1]^N} H(s) + \min_{v \in [-1,1]^N} V(v) \quad (9)$$

Two N-dimensional vectors $x = s+v$ and $y = s-v$ are defined. The objective function of the optimization problem originally desired to solve is only H, but by introducing a function referred to as V here, a new function that can be updated in parallel by MCMC can be obtained. Then, the function H' can be rewritten as Expression 10.

[Expression 10]

$$H' = \frac{1}{2} \left\{ -x^T J y - h^T (x + y) + \frac{(x-y)^T W (x-y)}{2} \right\} \quad (10)$$

That is, the minimization problem of Expression 5 can be rephrased as a minimization problem of Expression 11.

[Expression 11]

$$\min_{|x_i| + |y_i| \leq 2} \left\{ G(x, y) := -x^T J y - h^T (x + y) + \frac{(x-y)^T W (x-y)}{2} \right\} \quad (11)$$

If the optimum solution of Expression 11 is expressed with x* and y*, the equation of s*=(x*+y*)/2 is established. These arguments are established even if W is a zero matrix.

From the above, the optimum solution of the mixed binary quadratic programming problem expressed as Expression 2 can be obtained from the solution of the constrained quadratic programming problem presented in Expression 11. In order to obtain the solution, MCMC is used.

Figure 2:
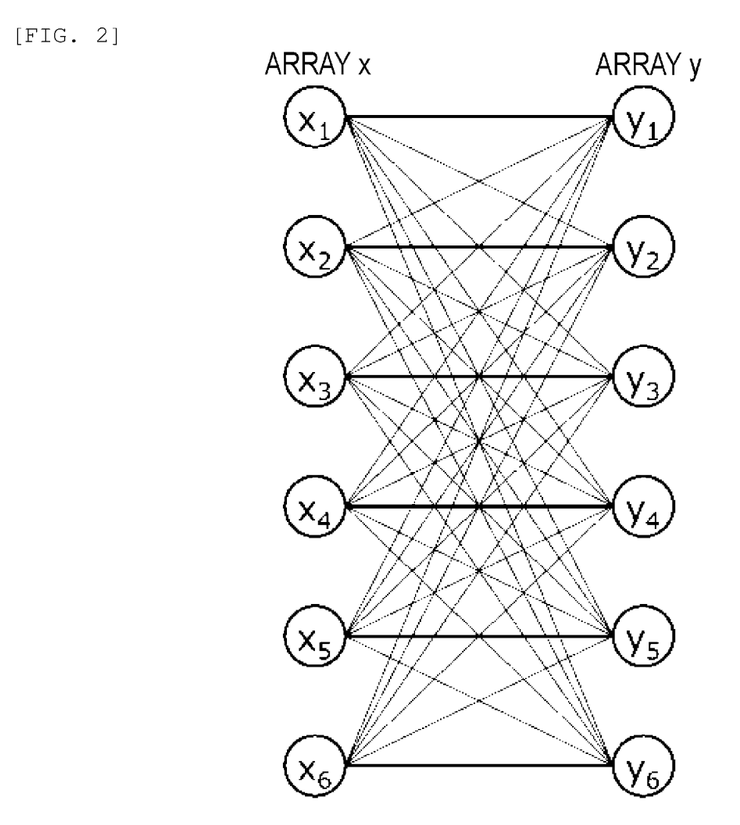
FIG. 2 is a diagram providing a description of an embodiment.

FIG. 2 is a graphical model indicating the relationship between the variables of the function G presented in Expression 11. The relationship between the variables of the function G can be represented by a complete bipartite graph. The only variables that can be multiplied by the variable $x_i$ in the function G are $y_1, \ldots, y_N$ and $x_i$. When stochastically updating a variable value, MCMC uses a value of a variable related to that variable. That is, when the value of the variable $x_1$ is updated, $y_1, \ldots, y_N$, and $x_1$ are obtained and other variables (here, $x_2, \ldots, x_N$) are not referred to. The same is also applied to the update of the values of other variables, such as $x_2$. Therefore, if the value of the variable array y is constant, the theoretical requirement of MCMC is not violated even if each value of the array x is stochastically updated independently at the same time.

Similarly, variables that can be multiplied by the variable $y_i$ are $x_1, \ldots, x_N$ and $y_i$, only. Therefore, while the values of the variable arrays x are constant, each value of the array y can be stochastically updated independently and simultaneously.

From the above, by executing MCMC including the procedure of repeating "simultaneous update of $x_1, \ldots, x_N$" and "simultaneous update of $y_1, \ldots, y_N$", while enjoying the advantage of speeding up by parallelization, the arrays x and y that minimize the function G can be searched.

Note that in the discussion of this example, there are no constraints on the matrix J. For example, even if all the elements of the matrix J are non-zero, the above argument is established, and thus, a parallel update can be performed.

Figure 3:
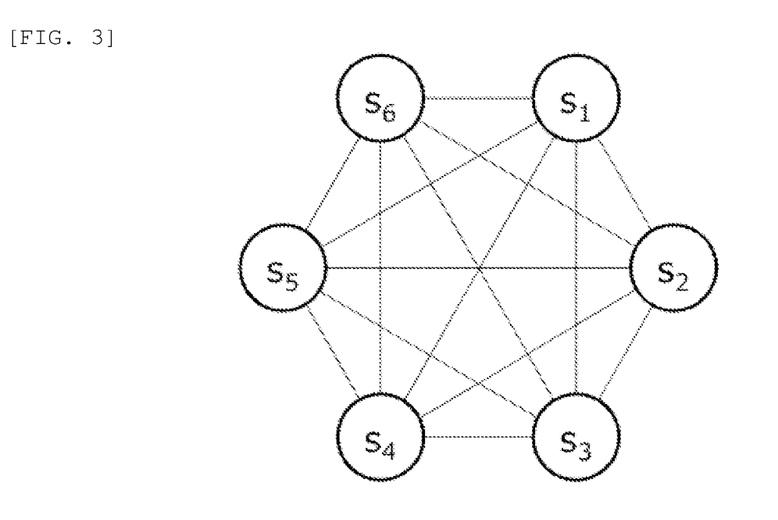
FIG. 3 is a diagram providing a description of the embodiment.

FIG. 3 is an example of a fully connected graph. On the other hand, when MCMC is applied directly to the minimization problem of Expression 2, which is the original problem, since those relating to the variable arrays are expressed by a fully connected graph as illustrated in FIG. 3, the probability can be updated for only one variable at a time, and the update is limited to sequential update.

From here, the procedure for the stochastic update for each variable will be described. The variable to be updated is set to $x_i$. When the values of the variables $y_1$ to $y_N$ are constant, the existence probability $p(x_i)$ of the variable $x_i$ in the Boltzmann distribution at the temperature T satisfies Expression 12.

[Expression 12]

$$p(x_i) \propto e^{-\frac{w_i}{2T}\left(\left(x_i - \frac{A_i}{w_i}\right)^2 - \frac{A_i^2}{w_i^2}\right)} \quad (12)$$

Here, the variable $A_i$ is a value obtained by Expression 13.

[Expression 13]

$$A_i = h_i + w_i y_i + \sum_j J_{ij} y_j \quad (13)$$

Since the variables $x_i$ and $y_i$ are $|x_i|+|y_i| \leq 2$, the range in which $x_i$ can move is $-(2-|y_i|)$ or more and $(2-|y_i|)$ or less. Therefore, with respect to the variable $x_i$, the next state of $x_i$ only needs to be sampled based on a truncated normal distribution whose domain is $-(2-|y_i|)$ or more and $(2-|y_i|)$ or less in a normal distribution with the mean of $A_i/w_i$ and the variance of $T/w_i$. In this method, the next state is determined regardless of the current state of $x_i$. The same is applied to $y_i$. In the present specification, if the variables of x and y are not distinguished, the variables may be expressed as s.

Random numbers that follow the standard normal distribution can be generated by the Box-Muller method. Since the domain is limited here, the algorithm disclosed in NPL 2 may be used.

The optimum solution search can be regarded as sampling from the equilibrium state at temperature 0. Therefore, in order to realize a high-quality solution search, it is preferable to converge to an equilibrium state in a short time. In order to improve the convergence to the equilibrium state, various techniques have been proposed by MCMC and these techniques can also be utilized. For example, in NPL 3, an over-relaxation method is proposed. As a candidate for the next state, not only one state but also K states are sampled from the Boltzmann distribution at temperature T. Then, in addition to the sampled K states, the total (K+1) states of the current state are rearranged and expressed as $x_c^0 \leq x_c^r = x_i \leq x_c^K$. That is, the current state is the (r+1)-th from the smallest of the (K+1) values. Then, $x_c^{K+1-r}$ is employed for the next state. In this method, the next state depends on the current state of $x_i$.

Figure 4:
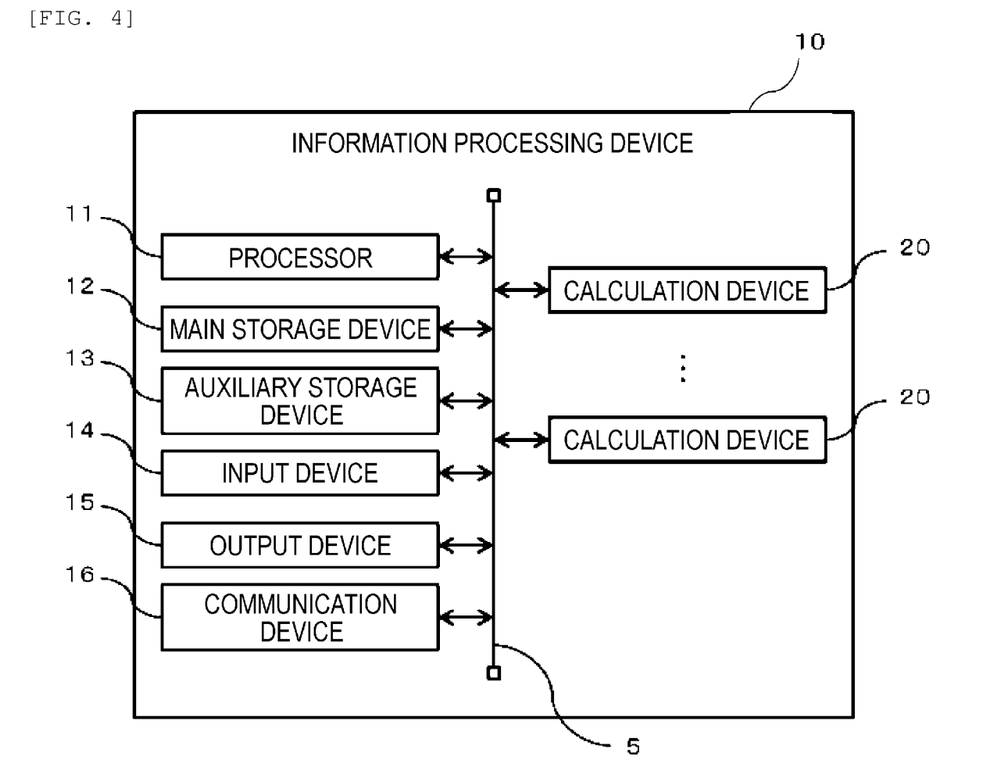
FIG. 4 is a block diagram illustrating a schematic configuration of an information processing device.
Figure 5:
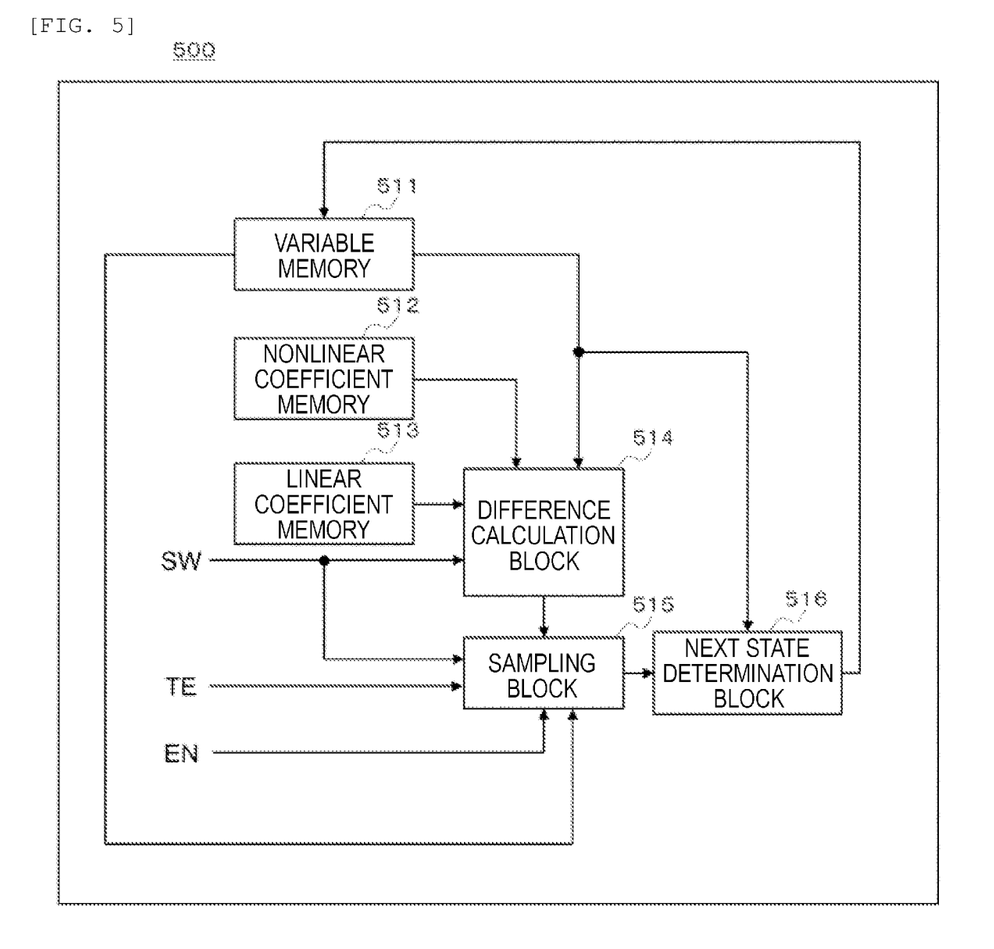
FIG. 5 is a block diagram illustrating a calculation system.
Figure 6:
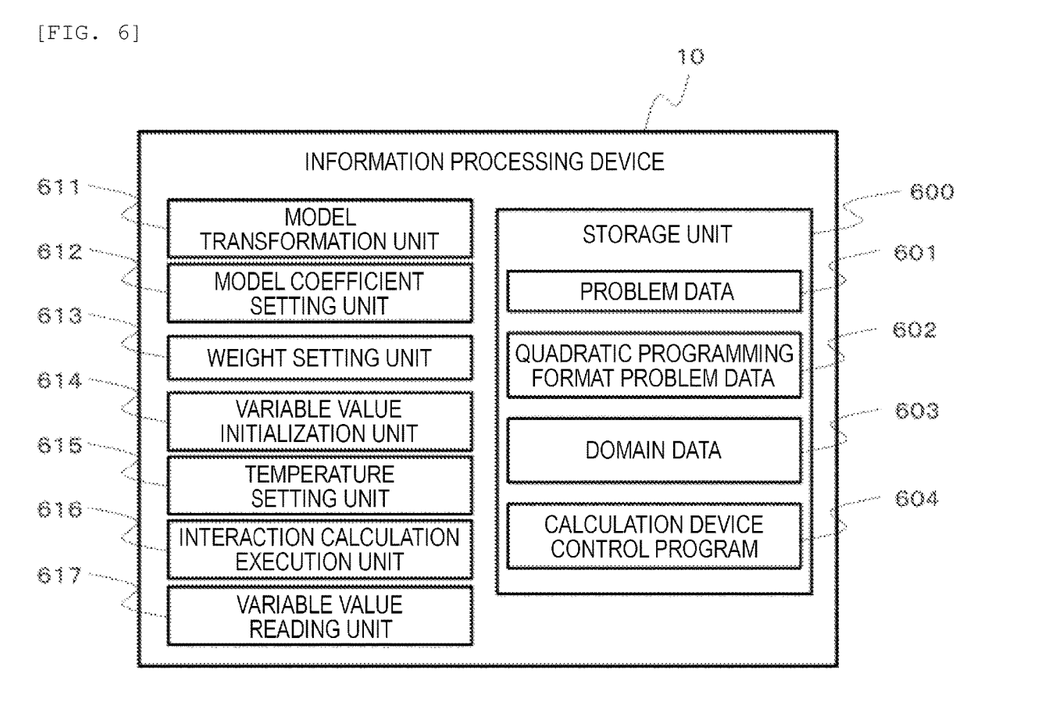
FIG. 6 is a function block diagram illustrating a main function included in the information processing device.

Based on the above, FIGS. 4 to 6 illustrate the configuration of the information processing device that realizes the present invention.

FIG. 4 is an example of an information processing device that searches for the optimum solution of a mixed binary quadratic programming problem. As illustrated in the drawing, an information processing device 10 includes a processor 11, a main storage device 12, an auxiliary storage device 13, an input device 14, an output device 15, a communication device 16, one or more calculation devices 20, and a system bus 5 that communicably connects the devices. For example, the information processing device 10 may be realized by using a virtual information processing resource such as a cloud server of which a part or all is provided by a cloud system. Further, the information processing device 10 may be realized by, for example, a plurality of information processing devices that operate in cooperation with each other and are communicably connected to each other.

The processor 11 is configured, for example, by using a central processing unit (CPU) or a micro processing unit (MPU). The main storage device 12 is a device for storing programs or data, and is, for example, a read only memory (ROM), a static random access memory (SRAM), a non-volatile ram (NVRAM), a mask read only memory (mask ROM), a programmable ROM (PROM), a random access memory (RAM), a dynamic random access memory (DRAM), and the like), and the like. The auxiliary storage device 13 is a hard disk drive, a flash memory, a solid state drive (SSD), and an optical storage device (such as a compact disc (CD), a digital versatile disc (DVD)). The programs and data stored in the auxiliary storage device 13 are read into the main storage device 12 at any time.

The input device 14 is a user interface that receives input of information from the user, and is, for example, a keyboard, a mouse, a card reader, or a touch panel. The output device 15 is a user interface that provides information to the user, and is, for example, a display device (such as a liquid crystal display (LCD) and a graphic card) that visualizes various kinds of information, an audio output device (speaker), and a printing device. The communication device 16 is a communication interface that communicates with other devices and is, for example, a Network Interface Card (NIC), a wireless communication module, a universal serial interface (USB) module, and a serial communication module.

The calculation device 20 is a device that executes a process related to the optimum solution search of the mixed binary quadratic programming problem. The calculation device 20 may take the form of an expansion card to be mounted on the information processing unit 10, such as a graphics processing unit (GPU). The calculation device 20 is configured with hardware such as a complementary metal oxide semiconductor (CMOS) circuit, a field programmable gate array (FPGA), and an application specific integrated circuit (ASIC). The calculation device 20 includes a control device, a storage device, an interface for connecting to the system bus 5, and transmits and receives commands and information to and from the processor 11 via the system bus 5. The calculation device 20 may be, for example, one that is communicably connected to another calculation device 20 via a communication line and operates in cooperation with the other calculation device 20. The function realized by the calculation device 20 may be realized, for example, by causing a processor (such as CPU and GPU) to execute a program.

The calculation device 20 illustrated in FIG. 4 is described below in FIG. 5. One or a plurality of calculation devices 20 can be mounted.

FIG. 5 is a diagram for illustrating an operating principle of the calculation device 20 and is a block diagram of a system (hereinafter, referred to as a calculation system 500) that configures the calculation device 20. The calculation system 500 realizes a function of sampling the variable array $x_1, \ldots, x_N$ or the variable array $y_1, \ldots, y_N$ from the Boltzmann distribution (Expression 12) at the temperature T. Hereinafter, an operating principle of the calculation device 20 is described with reference to the same drawing.

As illustrated in the drawing, the calculation system 500 includes a variable memory 511, a nonlinear coefficient memory 512, a linear coefficient memory 513, a difference calculation block 514, a sampling block 515, and a next state determination block 516.

Information indicating the variables $x_1, \ldots, x_N$ and $y_1, \ldots, y_N$ described above is stored in the variable memory 511 of each of the calculation system 500 (see FIG. 2).

The information indicating the matrix J is stored in the nonlinear coefficient memory 512. The matrix J is generally a symmetric matrix, and the usage amount of the nonlinear coefficient memory 512 can be reduced by using this symmetry. Information indicating the vector h is stored in the linear coefficient memory 513.

As illustrated in the drawing, a control signal EN, a weight signal SW, and a temperature signal TE are input to the calculation system 500.

The signal EN indicates which of the variable arrays x and y is updated, with a signal that periodically repeats the values of high (H) and low (L). For example, when EN is H, it is determined that the variable array $x_i$ s updated, and when EN is L, it is determined that the variable array y is updated. According to the signal EN, the variables $x_1, \ldots, x_N$ are simultaneously updated, and the variables $y_1, \ldots, y_N$ are simultaneously updated. In FIG. 5, the signal EN is input only to the sampling block 515 for simplification, but the same is applied to other places, such as the variable memory that require this signal.

The signal SW is a signal indicating a vector of N elements representing the diagonal components of the diagonal matrix W.

The value of the matrix J stored in the nonlinear coefficient memory 512, the vector h stored in the linear coefficient memory 513, the signal SW, and the variable s (x or y) stored in the variable memory 511 are input to the difference calculation block 514. The difference calculation block 514 outputs $(J+\mathrm{diag}(w_1, \ldots, w_N))\,y+h$ when the signal EN is H, and outputs $(J+\mathrm{diag}(w_1, \ldots, w_N))\,x+h$ when the signal EN is L. This output value corresponds to the above-mentioned $A_i$.

The sampling block 515 receives the output of the difference calculation block 514, the signal SW, a signal TW that stores a value of the temperature parameter, the signal EN, and values of other variables. And the i-th element is randomly sampled and output from the truncated normal distribution represented by Expression 12 with $-(2-|y_i|)$ or more and $(2-|y_i|)$ or less as the domain when the signal EN is H and $-(2-|x_i|)$ or more and $(2-|x_i|)$ or less as the domain when the signal EN is L.

The next state determination block 516 determines the next state of the variable based on one or more values output from the sampling block 515. If the MCMC update rule is defined as a simple heat-bath algorithm, the next state determination block 516 may receive only one output value of the sampling block 515 and write the received output value as it is to the variable memory 511. If a well-known over-relaxation method is used as the MCMC update rule, the next state determination block 516 receives a plurality of values from the sampling block 515 and the current value of the variable to be updated from the variable memory 511, selects one according to the over-relaxation method, and writes the value on the variable memory 511. As is well known, in the over-relaxation method, the next state is determined so that the correlation with the immediately preceding state is negative.

FIG. 6 illustrates the main functions (software configurations) included in the information processing device 10. As shown in the drawing, the information processing device 10 includes a storage unit 600, the model conversion unit 611, a model coefficient setting unit 612, a weight setting unit 613, a variable value initialization unit 614, a temperature setting unit 615, an interaction calculation execution unit 616, and a variable value reading unit 617. These functions are realized by the processor 11 reading and executing the program stored in the main storage device 12 or by the hardware included in the calculation device 20. The information processing device 10 may have other functions such as an operating system, a file system, a device driver, and a database management system (DBMS) in addition to the above functions.

Among the above functions, the storage unit 600 stores problem data 601, quadratic programming form problem data 602, domain data 603, and a calculation device control program 604 in the main storage device 12 or the auxiliary storage device 13. The problem data 601 is data, for example, in which an optimization problem or the like is described in a known predetermined description format. The problem data 601 is set by the user, for example, via a user interface (input device, output device, communication device, and the like).

The quadratic programming form problem data 602 is data generated by the model transformation unit 611 transforming the problem data 601 into data in a format that matches a format of the quadratic programming problem presented by Expression 4. According to the transformation, the domain of each given variable is written in the domain data 603. The domain data indicates, for example, whether each variable takes a binary value or a real value. The calculation device control program 604 is a program that is executed when the interaction calculation execution unit 616 controls the calculation device 20 or is loaded by the interaction calculation execution unit 616 on each of the calculation devices 20 and executed on the calculation devices 20.

The model transformation unit 611 transforms the problem data 601 into the quadratic programming format problem data 602, which is the format of the quadratic programming problem. Therefore, the function of deriving Expression 11 from Expression 1 may be implemented on the model transformation unit 611 as software or hardware. The function of the model transformation unit 611 may not be necessarily implemented on the information processing device 10, or the information processing device 10 may obtain the quadratic programming format problem data 602 generated by another information processing device or the like via the input device 14 or the communication device 16.

The model coefficient setting unit 612 sets the matrix J of Expression 4 in the nonlinear coefficient memory 512 and sets the vector h in the linear coefficient memory 513 based on the quadratic programming format problem data 602.

The variable value initialization unit 614 initializes the value of each variable stored in the variable memory 511 of the calculation unit 20. The variable value initialization unit 614 only needs to determine the value of each variable by random sampling uniformly from −1 or more and +1 or less. At this time, care must be taken to satisfy $|x_i|+|y_i|\leq 2$ which is the constraint related to the variable. Also, note that the value of each variable at this time is treated as continuous value.

The temperature setting unit 615 sets the temperature T used when the interaction calculation execution unit 616 searches for the optimum solution.

The interaction calculation execution unit 616 causes the calculation devices 20 to execute calculation of searching the variable arrays x and y (hereinafter, referred to as interaction calculation) that minimizes the function G represented by Expression 11 for each temperature T set by the temperature setting unit 615. In the interaction calculation, the interaction calculation execution unit 616 changes, for example, the temperature T from the higher side to the lower side.

If the optimum solution search by the interaction calculation execution unit 616 is ended, the variable value reading unit 617 reads the variable arrays x and y stored in the variable memory 511. Here, the read value is the solution of Expression 11. According to the above discussion, the N-dimensional vector $s^*=(x+y)/2$ is calculated. Then, the domain data 603 is read, a vector $s^+$ obtained by Expression 6 is output to the output device 15 and the communication device 16 as the final solution. That is, sgn($s^*_i$) is output if the i-th domain is found to be $\{-1, +1\}$ in the domain data 603, and $s_i$ itself is output if the i-th domain is $[-1, +1]$. In this way, a solution according to the defined range is obtained.

Figure 7:
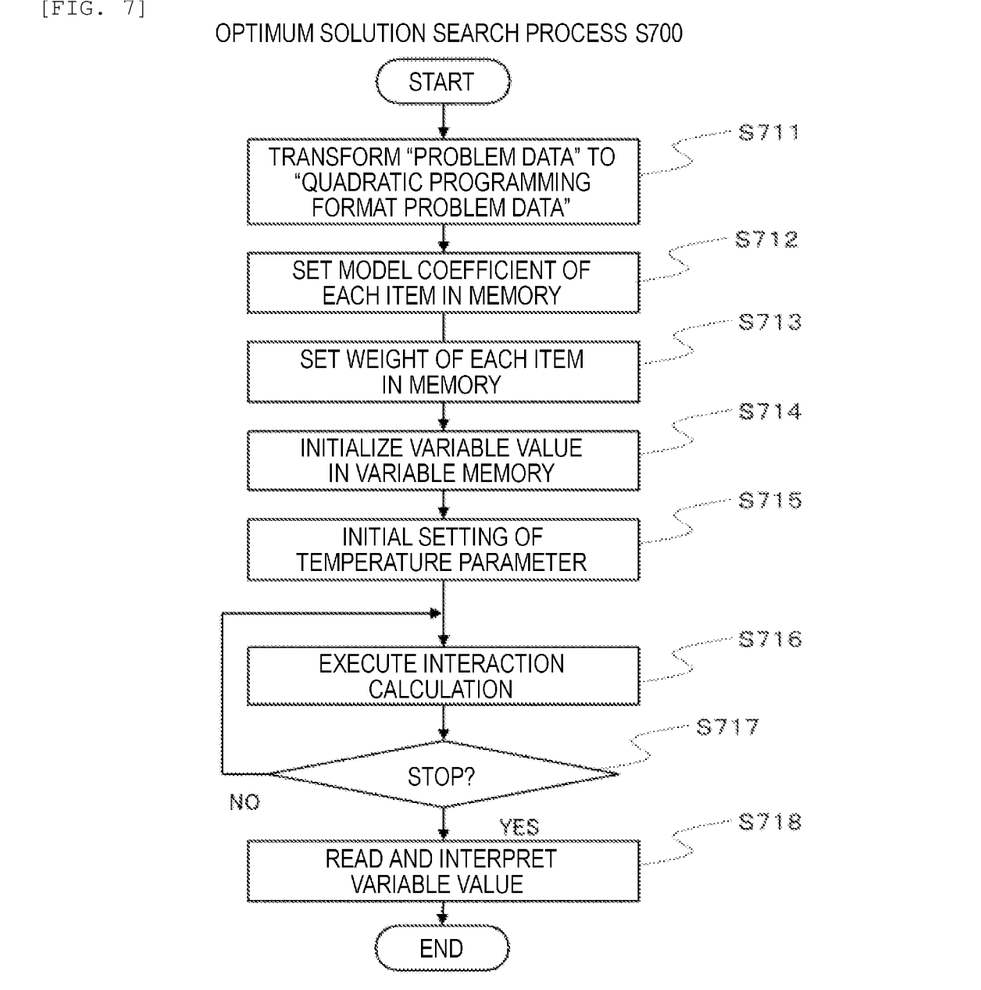
FIG. 7 is a flowchart illustrating an optimum solution search process.

FIG. 7 is a flowchart illustrating the process performed by the information processing device 10 during the optimum solution search (hereinafter, referred to as an optimum solution search process S700). Hereinafter, the optimum solution search process S700 is described with reference to the same drawing. In the following, the letter "S" attached before the reference numeral means a processing step. The optimum solution search process S700 is started by receiving an instruction from the user or the like via the input device 14, for example.

As illustrated in the figure, the model transformation unit 611 first transforms the problem data 601 into the quadratic programming format problem data 602 (S711). In the quadratic programming format problem data, for example, the matrix J and the vector h in the function H expressed by Expression 1 are expressed in an arbitrary format. If the storage unit 600 has already stored the quadratic programming format problem data 602, the process S711 is omitted. The process of S711 and the process of S712 and the subsequent processes may be executed by different devices, respectively. Further, the process of S711 and the process of S712 and the subsequent processes may be executed at different timings (for example, it is conceivable that the process of S711 is performed in advance).

Subsequently, the model coefficient setting unit 612 sets the values of the matrix J and the vector h to the nonlinear coefficient memory 512 and the linear coefficient memory 513 (S712). The value of the memory can also be set or edited by the user via a user interface (realized, for example, by the input device 14, the output device 15, and the communication device 16).

Subsequently, the weight setting unit 613 determines the value of the signal SW. As described in Expression 8 above, the signal SW is allowed to take an arbitrary value in searching for the optimum solution. Therefore, the signal value may always be 0. In this case, the calculation load can be reduced. In addition, as disclosed in Expressions 3 to 5 of PTL 2, the value may be determined from the eigenvalues of the matrix J. Otherwise, the value may be determined from the sum of rows of the matrix J. The calculation of the value calculation of the signal SW may be executed in the calculation device 20 or in the processor 11. Otherwise, the value may be set by the user himself/herself (S713).

Subsequently, the variable value initialization unit 614 initializes the value of each variable stored in the variable memory 511 (S714). The value stored in the variable memory 511 is a continuous value. As described above, the initial value may be random. Hereinafter, the parameter expressing Expression 11 is set.

Subsequently, the temperature setting unit 615 sets a series $T_k$ (k=1, 2, 3, . . . ) of the temperature parameters used in the optimum solution search (S715). The above-mentioned subscript k represents the type of temperature T to be set. As a method for setting the temperature T, for example, the method of PTL 1 can be employed.

Subsequently, the interaction calculation execution unit 616 executes the stochastic simultaneous update of the variable array by the calculation of the calculation system 500 illustrated in FIG. 5 (S716).

Subsequently, the interaction calculation execution unit 616 determines whether or not a stop condition is satisfied (for example, whether or not the temperature T has reached a preset minimum temperature) (S717). If the interaction calculation execution unit 616 determines that the stop condition is satisfied (S717: YES), the process proceeds to S718. Meanwhile, if the interaction calculation execution unit 616 determines that the stop condition is not satisfied (S717: NO), the process returns to S716.

In S718, the variable value reading unit 617 reads the value of the variable stored in the variable memory 511 and the domain of each variable of the quadratic programming form problem data 602 stored in the domain data 603. Then, the vector is calculated through the transformation based on Expression 6 and output as the solution of Expression 2 or 4. Here, the optimum solution search process S700 is completed.

As described in detail above, according to the information processing device 10 of the present embodiment, the optimum solution search of the mixed binary quadratic programming problem can be efficiently performed. Therefore, the optimization problem can be solved efficiently. The information processing device 10 (including the calculation device 20) has a simple structure and thus can be manufactured inexpensively and easily.

As long as the calculation system 500 has a function of executing a calculation for solving the optimization problem described above, the calculation system 500 may be configured with software or may be configured with hardware. Specifically, in the annealing method, not only the hardware mounted by an electronic circuit (digital circuit or the like) but also the method of mounting by a superconducting circuit or the like may be used. Further, hardware that realizes the Ising model other than the annealing method may be used. For example, a laser network method (optical parametric oscillation) and a quantum neural network are known. In addition, although some ideas are different, a quantum gate method in which the calculation performed by the Ising model is replaced with a gate such as the Hadamard gate, a rotating gate, and a control NOT gate can also be employed as the configuration of the present embodiment.

As a specific implementation example of the calculation system 500, an example of being implemented as a complementary metal-oxide semiconductor (CMOS) integrated circuit disclosed in PTL 1 or a logic circuit on a field programmable gate array (FPGA) will be described.

In the technology of PTL 1, a large number of units to which the technology of a static random access memory (SRAM) is applied are arranged, and a memory for storing variables and a circuit for updating variables are arranged in each unit.

Figure 8:
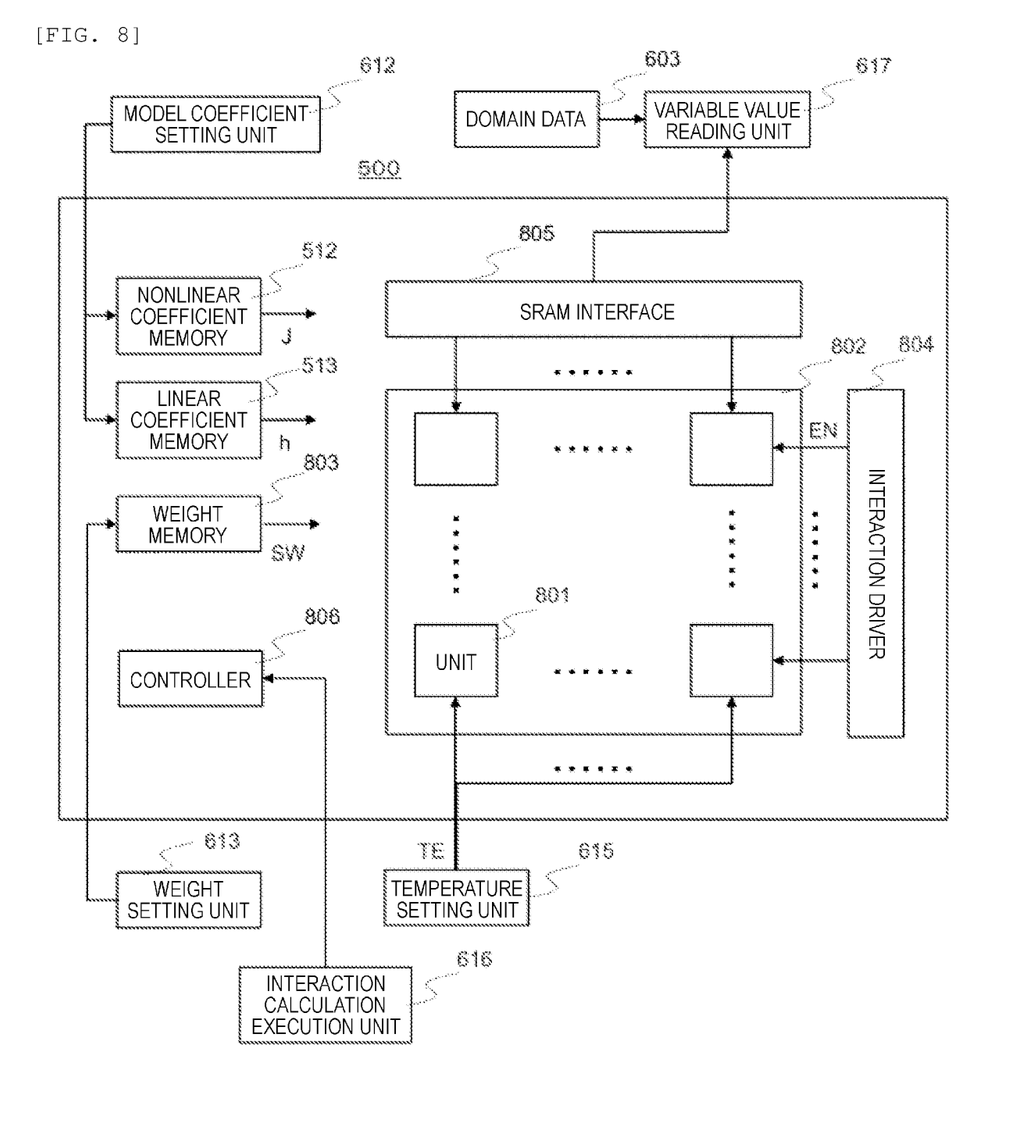
FIG. 8 is a detailed block diagram of the calculation system.

FIG. 8 is a block diagram illustrating a circuit configuration example when the technology of SRAM is applied to the calculation system 500 of the present embodiment. A plurality of units 801 constitute an array unit 802. Such a configuration can be manufactured by applying the semiconductor manufacturing technology.

Figure 9:
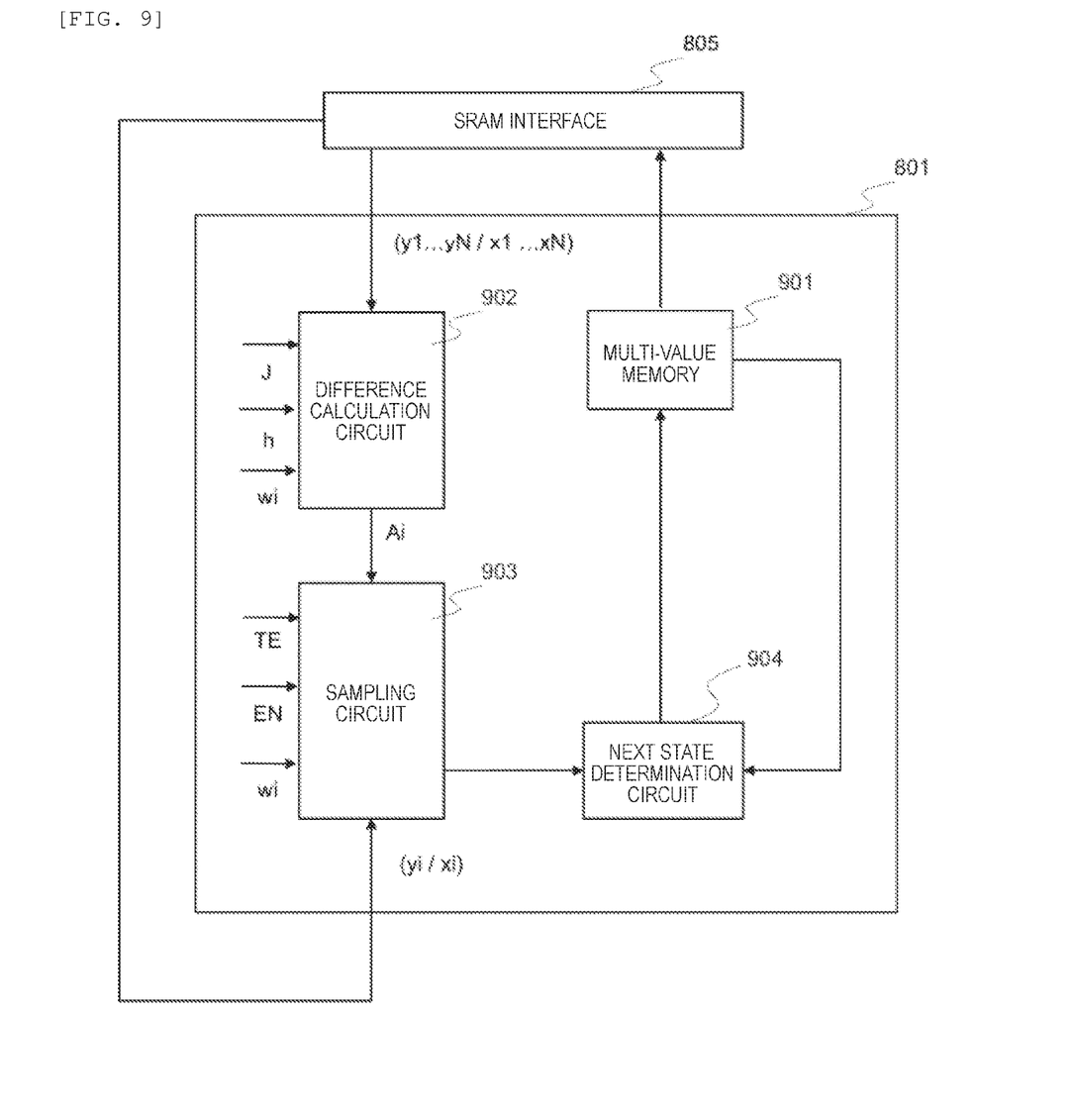
FIG. 9 is a block diagram of a unit constituting the calculation system.

One unit 801 includes a multi-value memory 901 that stores any one of the variables $x_1, \ldots, x_N$ and $y_1, \ldots, y_N$ and a configuration for updating the value of the multi-value memory 901. That is, 2N units 801 are prepared.

The configuration example of FIG. 8 will be described with reference to the generalized configuration of FIG. 5. The data stored in the nonlinear coefficient memory 512 and the linear coefficient memory 513 is set by the model coefficient setting unit 612. The nonlinear coefficient memory 512 stores the N×N matrix J, which is commonly used by all units 801. Further, the N-dimensional vector h is stored in the linear coefficient memory 513 and is commonly used by all the units 801. In order to reduce the circuit scale, these memories are common to each unit 801. Therefore, the nonlinear coefficient memory 512 and the linear coefficient memory 513 supply the coefficients J and h to all the units 801. However, the signal lines for that purpose are omitted in FIG. 8. In principle, each unit 801 may individually include the nonlinear coefficient memory 512 and the linear coefficient memory 513.

The vectors of the N elements $(w_1, \ldots, w_N)$ representing the diagonal components of the diagonal matrix W are stored in a weight memory 803. This data is set by the weight setting unit 613. Since the i-th unit that stores $x_i$ and $y_i$ uses the i-th component $w_i$, it is required to switch the value of the signal SW for each unit 801. In FIG. 8, the signal line for supplying the signal SW to the unit 801 is omitted.

The temperature signal TE supplied from the temperature setting unit 615 is supplied to all the units 801. The function and configuration of the temperature signal follow the prior art. The signal line that supplies the signal TE to the unit 801 is omitted.

An interaction driver 804 alternately inputs signals for allowing the update of the variable x and a signal for allowing the update of the variable y to each unit 801. As a result, the variables $x_1$ to $x_N$ are updated at the same time, and the variables $y_1$ to $y_N$ are updated at the same time.

An SRAM interface 805 writes and reads to and from the memory that stores the variables of the units 801 generated by applying the circuit configuration of the SRAM. The variable read after the process is completed in the calculation system 500 is sent to the variable value reading unit 617. The variable value reading unit 617 obtains a solution to the mixed binary quadratic programming problem by outputting the read variable as a continuous value or a binary value based on the domain data 603.

The controller 806 initializes the calculation system 500 and reports the end of the process according to the instruction of the interaction calculation execution unit 616.

FIG. 9 is a diagram illustrating a circuit configuration example of one unit 801. The multi-value memory 901 that stores any one of the continuous variables $x_1, \ldots, x_N$ and $y_1, \ldots, y_N$ is included in one unit.

The difference calculation circuit 902 realizes the function of the difference calculation block 514. When the variable stored in the multi-valued memory 901 is any one of $x_1, \ldots, x_N$, the vectors of $(y_1, \ldots, y_N)$ are input to the difference calculation circuit 902. When the variable stored in the multi-value memory 901 is any one of $y_1, \ldots, y_N$, the vectors of $(x_1, \ldots, x_N)$ are input. These variable vectors are read and generated by an SRAM interface 805 from the multi-value memory 901 of another unit 801. Further, the N×N matrix J and the N-dimensional vector h, which are coefficients, are input. In addition, the weight $w_i$ is input. The difference calculation circuit 902 outputs the value $A_i$ of the i-th row of $(J+\text{diag}(w_1, \ldots, w_N))$ s+h (s is a variable vector of x or y) with respect to these inputs.

A sampling circuit 903 realizes the function of the sampling block 515. The output $A_i$, the signal EN, the signal SW, the signal TE, and $y_i$ if the variable stored in the multi-value memory 901 is $x_i$, or $x_i$ if the variable stored in the multi-valued memory 901 is $y_i$ are input to the sampling circuit 903. Then, the candidate of the next state of the variable is sampled from the existence probability $p(s_i)$ of the variable $s_i$ based on Expression 12.

A state determination circuit 904 determines the next state of the variable based on one or a plurality of candidates output from the sampling circuit 903. In the state determination circuit 904, for example, when the over-relaxation method is followed, if a plurality of candidates are obtained from the sampling circuit 903, a candidate whose correlation with the state immediately before the multi-valued memory 901 is negative is selected, and the next state is determined. The determined next state is stored in the multi-value memory 901.

In the above, the difference calculation block 514, the sampling block 515, and the next state determination block 516 are assumed to be hardware such as FPGA. However, for example, software utilizing a large number of calculation devices mounted on a GPU, a vector type computer, or the like can be implemented. By providing a large number of units 801 in this manner, variables can be updated in parallel.

Although one embodiment has been described in detail above, it is obvious that the present invention is not limited to the above embodiment and can be variously modified without departing from the gist thereof. For example, the above embodiments have been described in detail in order to describe the present invention for easier understanding and are not necessarily limited to the one including all the described configurations. Further, another configuration can be added, deleted, replaced with respect to a part of the configuration of the above embodiments.

Further, each of the above configurations, functional units, processing units, processing means, and the like may be realized by hardware by designing a part or all of them by, for example, an integrated circuit. Further, each of the above configurations, functions, and the like may be realized by software by the processor interpreting and executing a program that realizes each function. Information such as programs, tables, and files that realize each function can be placed in a memory, a hard disk, a recording device such as a solid state drive (SSD), or a recording medium such as an IC card, an SD card, or a DVD.

Also, in each of the above figures, the control lines and information lines are illustrated as necessary for explanation, and not all the control lines and information lines in the implementation are necessarily illustrate. For example, in practice, almost all configurations may be considered connected to each other.

Further, the arrangement forms of various functional units, various processing units, and various databases of the information processing device 10 described above are only examples. The arrangement forms of the various functional units, the various processing units, and the various databases can be changed to the optimal arrangement forms from the viewpoints of the performance, processing efficiency, communication efficiency, and the like of the hardware and software included in the information processing device 10.

In addition, the configuration of the database (schema and the like) that stores the various data described above can be flexibly changed from the viewpoints of efficient use of resources, improvement of processing efficiency, improvement of access efficiency, improvement of search efficiency, and the like.

INDUSTRIAL APPLICABILITY

It can be used for information processing devices, calculation devices, information processing methods, and the like.

REFERENCE SIGNS LIST

- 10: information processing device
- 11: processor
- 12: main storage device
- 20: calculation device
- 511: variable memory
- 512: nonlinear coefficient memory
- 513: linear coefficient memory
- 514: difference calculation block
- 515: sampling block
- 516: next state determination block
- 600: storage unit
- 601: problem data
- 602: quadratic programming format problem data
- 603: domain data
- 604: calculation device control program
- 611: model transformation unit
- 612: model coefficient setting unit
- 613: weight setting unit
- 614: variable value initialization unit
- 615: temperature setting unit
- 616: interaction calculation execution unit
- 617: variable value reading unit

The invention claimed is:

1. A calculation system comprising:
  a variable memory that stores a value indicating a state of a variable of a mixed integer quadratic programming problem;
  a state transition calculation block that calculates the next state of the value indicating the state of the variable;
  a nonlinear coefficient memory that stores a nonlinear coefficient of the state transition calculation block;
  a linear coefficient memory that stores a linear coefficient of the state transition calculation block;
  a weight input line that receives a weight signal of the state transition calculation block; and
  a temperature input line that receives a temperature signal of the state transition calculation block, wherein
  the state transition calculation block includes
    a difference calculation block that calculates difference calculation by using the weight signal, the nonlinear coefficient, and the linear coefficient,
    a sampling block that performs random sampling from a probability distribution with an interval constraint by using the weight signal, the temperature signal, and an output value of the difference calculation block, and
    a next state determination block that calculates the next state of the variable by using a value read from the variable memory.

2. The calculation system according to claim 1, wherein the variable memory stores continuous values as values $x_1, \ldots, x_N$ and $y_1, \ldots, y_N$ indicating the state of the variable.

3. The calculation system according to claim 2, wherein the nonlinear coefficient J is an N×N matrix,
  the linear coefficient h is an N-dimensional vector, and
  the weight signal SW is a signal indicating vectors of N elements indicating diagonal components $w_1, \ldots, w_N$ of a diagonal matrix W.

4. The calculation system according to claim 3, wherein the nonlinear coefficient J, the linear coefficient h, the weight signal SW, and the value stored in the variable memory are input to the difference calculation block to output $(J+\text{diag}(w_1, \ldots, w_N))$ s+h, and
  here, s is any one of the N-dimensional vectors $(x_1, \ldots, x_N)$ and $(y_1, \ldots, y_N)$.

5. The calculation system according to claim 3, wherein the nonlinear coefficient J is a symmetric matrix.

6. The calculation system according to claim 5, wherein the element of the i-th row and i-th column of the nonlinear coefficient J is 0.

7. The calculation system according to claim 4, wherein an output A of the difference calculation block, the weight signal SW, the temperature signal TE, a control signal EN, and the value stored in the variable memory are input to the sampling block,
  one or a plurality of values are randomly sampled and output from a normal distribution with $-(2-|y_i|)$ or more and $(2|y_i|)$ or less as a domain when the control signal EN is a first value and with $-(2-|x_i|)$ or more and $(2-|x_i|)$ or less as a domain when the control signal EN is a second value, and
  the normal distribution is formed based on the output A, the weight signal SW, and the temperature signal TE.

8. The calculation system according to claim 7, wherein the normal distribution is a normal distribution with a mean of $A_i/w_i$ and a variance of $T/w_i$, and
  here, $A_i$ is the i-th value of the output A, and T is the value of the temperature signal TE.

9. The calculation system according to claim 1, wherein the next state determination block calculates the next state of the variable based on at least one of a heat-bath algorithm and an over-relaxation method.

10. The calculation system according to claim 4, further comprising:
a plurality of units each including a multi-value memory that stores one of values $x_1, \ldots, x_N$ and $y_1, \ldots, y_N$ indicating the state of the variable, wherein
each unit includes a difference calculation unit that executes a function of a part of the difference calculation block, a sampling unit that executes a function of a part of the sampling block, and a next state determination unit that executes a function of a part of the next state determination block, and
in the unit including a multi-value memory that stores one of the value $x_i$ or $y_i$ indicating the state of the variable,
the difference calculation unit receives an input of the nonlinear coefficient J, the linear coefficient h, the i-th diagonal component $w_i$ of the diagonal matrix W, and the N-dimensional vector $(y_1, \ldots, y_N)$ when the value stored in the multi-value memory of the unit is $x_i$ and the N-dimensional vector $(x_1, \ldots, x_N)$ when the value stored in the multi-value memory of the unit is $y_i$, and outputs $$A_i = h_i + w_i s_i + \Sigma_{ij} s_j$$

(here, $h_i$ is the i-th element of the linear coefficient h, and s is y when the value stored in the multi-value memory of the unit is $x_i$ and x when the value stored in the multi-value memory of the unit is $y_i$).

11. The calculation system according to claim 10, wherein the sampling unit receives an input of the output $A_i$ of the difference calculation unit, the diagonal component $w_i$, the temperature signal TE, the control signal EN, and the value stored in the variable memory, and
randomly samples and outputs one or a plurality of values from a normal distribution of a mean of $A_i/w_i$ and a variance of $T/w_i$ with $-(2-|y_i|)$ or more and $(2-|y_i|)$ or less as a domain when the control signal EN is a first value and $-(2-|x_i|)$ or more and $(2-|x_i|)$ or less as a domain when the control signal EN is a second value
(here, T is the value of the temperature signal TE).

12. An information processing device comprising:
the calculation system according to claim 2; and
a computer that controls the calculation system, wherein
the information processing device includes a storage unit and a variable value reading unit,
the storage unit stores the domain of the variable of the mixed integer quadratic programming problem, and
the variable value reading unit reads a value from the variable memory and transforms at least a part of the continuous value to a binary value based on the domain of the variable.

13. An information processing device comprising:
the calculation system according to claim 11; and
a computer that controls the calculation system, wherein
the information processing device includes a storage unit and a variable value reading unit,
the storage unit stores the domain of the variable of the mixed integer quadratic programming problem, and
the variable value reading unit reads a value from the variable memory and transforms the continuous value to a binary value based on the domain of the variable.

14. An optimum solution search process method executed by an information processing device including the calculation system according to claim 4, and a computer that controls the calculation system, the method comprising:
a first step of preparing quadratic programming format problem data and domain data that is a domain of a variable of the quadratic programming format problem data in a storage unit of the computer;
a second step of setting the nonlinear coefficient J to the nonlinear coefficient memory and setting a value of the linear coefficient h in the linear coefficient memory, by a model coefficient setting unit of the computer;
a third step of determining a value of the weight signal SW, by a weight setting unit of the computer;
a fourth step of initializing the value of each variable stored in the variable memory, by a variable value initialization unit of the computer;
a fifth step of causing the state transition calculation block of the calculation system to execute a calculation of the next state of the variable, by an interaction calculation execution unit of the computer; and
a sixth step of reading the value of each variable from the variable memory and transforming the value based on the domain data, by a variable reading unit of the computer.

15. An optimum solution search process method executed by an information processing device including the calculation system according to claim 11, and a computer that controls the calculation system, the method comprising:
a first step of preparing quadratic programming format problem data and domain data that is a domain of a variable of the quadratic programming format problem data in a storage unit of the computer;
a second step of setting the nonlinear coefficient J in the nonlinear coefficient memory and setting a value of the linear coefficient h in the linear coefficient memory, by a model coefficient setting unit of the computer;
a third step of determining a value of the weight signal SW, by a weight setting unit of the computer;
a fourth step of initializing the value of each variable stored in the variable memory, by a variable value initialization unit of the computer;
a fifth step of causing the state transition calculation block of the calculation system to execute a calculation of the next state of the variable, by an interaction calculation execution unit of the computer; and
a sixth step of reading the value of each variable from the variable memory and transforming the value based on the domain data, by a variable reading unit of the computer, wherein
the quadratic programming format problem data is data indicating a mixed integer quadratic programming problem in which variables that take binary values and variables that take real numbers are mixed, and
the domain data indicates whether each variable takes a binary value or a real number.

* * * * *